(12) United States Patent
Sugawara et al.

(10) Patent No.: US 11,635,374 B2
(45) Date of Patent: Apr. 25, 2023

(54) OPTICAL TESTING APPARATUS

(71) Applicant: ADVANTEST CORPORATION, Tokyo (JP)

(72) Inventors: Toshihiro Sugawara, Gunma (JP); Shin Masuda, Miyagi (JP); Takao Sakurai, Miyagi (JP); Hidenobu Matsumura, Baden-Württemberg (DE); Takao Seki, Gunma (JP)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 16/837,326

(22) Filed: Apr. 1, 2020

(65) Prior Publication Data

US 2020/0355608 A1 Nov. 12, 2020

(30) Foreign Application Priority Data

May 9, 2019 (JP) .............................. JP2019-088777

(51) Int. Cl.
*G01N 21/47* (2006.01)
*G01N 21/89* (2006.01)

(52) U.S. Cl.
CPC ..... *G01N 21/47* (2013.01); *G01N 2021/8905* (2013.01)

(58) Field of Classification Search
CPC ..... G02B 26/122; G01J 1/4257; G01N 30/82; G01N 2291/0237; G01N 2291/02491; G01N 33/57484; G01N 2021/6419
See application file for complete search history.

(56) References Cited

U.S. PATENT DOCUMENTS 8,368,876 B1 * 2/2013 Johnson ................. G01S 17/89
356/3.01
RE46,930 E 7/2018 Mimeault
(Continued)

FOREIGN PATENT DOCUMENTS

CN 103885065 6/2014
CN 107688172 2/2018
(Continued)

OTHER PUBLICATIONS

Office Action issued by the Taiwan Intellectual Property Office (TIPO) for Taiwanese Patent Appl. No. 109108046, dated Aug. 2, 2021.
(Continued)

*Primary Examiner* — Michael P Stafira
(74) *Attorney, Agent, or Firm* — Greenblum & Bernstein, P.L.C.

(57) ABSTRACT

An optical testing device for use in testing an optical measuring instrument provides incident light from a light source to an incident object and receives reflected light due to reflection of the incident light at the incident object. The optical testing device includes an incident light receiving section that receives incident light, and a light signal providing section. The light signal providing section provides a light signal to the incident object after a predetermined delay time since the incident light receiving section has received the incident light. A reflected light signal due to reflection of the light signal at the incident object is provided to the optical measuring instrument. The delay time is approximately equal to the time between emission of the incident light from the light source and reception of the reflected light by the optical measuring instrument in the case of actually using the optical measuring instrument.

9 Claims, 15 Drawing Sheets

(56) References Cited

U.S. PATENT DOCUMENTS

| | | | |
|---|---|---|---|
| 2002/0186919 A1 | 12/2002 | Pepper | |
| 2006/0007422 A1 | 1/2006 | Dimsdale | |
| 2006/0103850 A1* | 5/2006 | Alphonse | G01B 9/0209 |
| | | | 356/479 |
| 2007/0024842 A1 | 2/2007 | Nishizawa et al. | |
| 2007/0252974 A1 | 11/2007 | Dimsdale | |
| 2009/0076758 A1 | 3/2009 | Dimsdale | |
| 2010/0277713 A1 | 11/2010 | Mimeault | |
| 2010/0309024 A1 | 12/2010 | Mimeault | |
| 2011/0026015 A1 | 2/2011 | Mimeault et al. | |
| 2013/0044310 A1 | 2/2013 | Mimeault | |
| 2013/0257461 A1* | 10/2013 | Heidmann | G01R 31/2656 |
| | | | 324/703 |
| 2016/0097844 A1 | 4/2016 | Takano | |
| 2019/0072672 A1* | 3/2019 | Yao | G01S 17/931 |
| 2019/0383648 A1* | 12/2019 | Austin | G01D 5/35335 |

FOREIGN PATENT DOCUMENTS

| | | | |
|---|---|---|---|
| CN | 109655813 A * | 4/2019 | |
| EP | 2235561 | 4/2017 | |
| JP | 2000-275340 | 10/2000 | |
| JP | 2001-126598 | 5/2001 | |
| JP | 2006-126168 | 5/2006 | |
| JP | 2008-506115 | 2/2008 | |
| JP | 2017-015729 | 1/2017 | |
| TW | 573136 | 1/2004 | |
| WO | 2014/208018 | 12/2014 | |
| WO | WO-2017204050 A1 * | 11/2017 | B64C 39/02 |

OTHER PUBLICATIONS

Office Action from Korean Intellectual Property Office in Korean Pat. Appl. No. 10-2020-0023982, dated May 21, 2021, together with an English language translation.

* cited by examiner

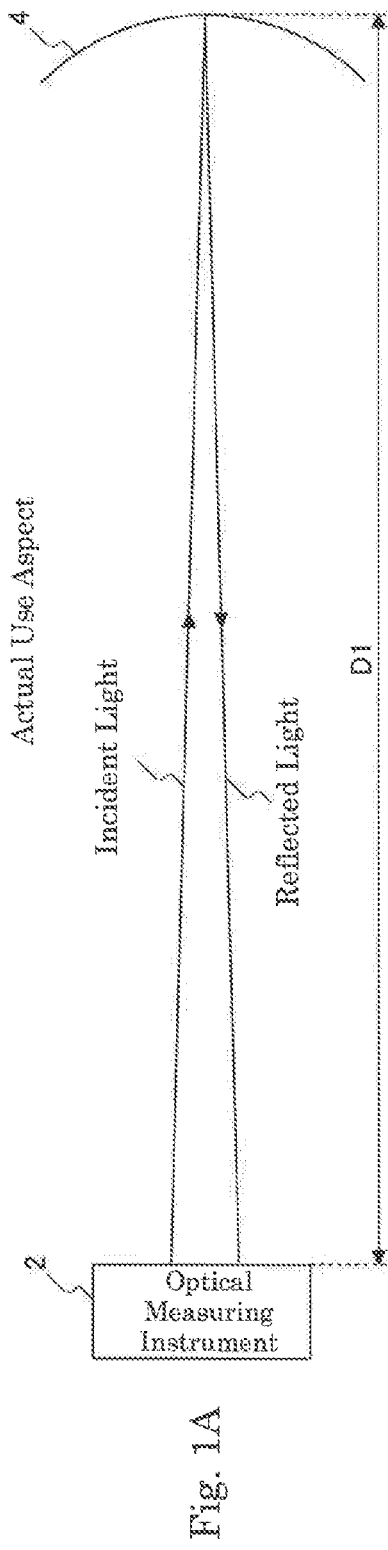
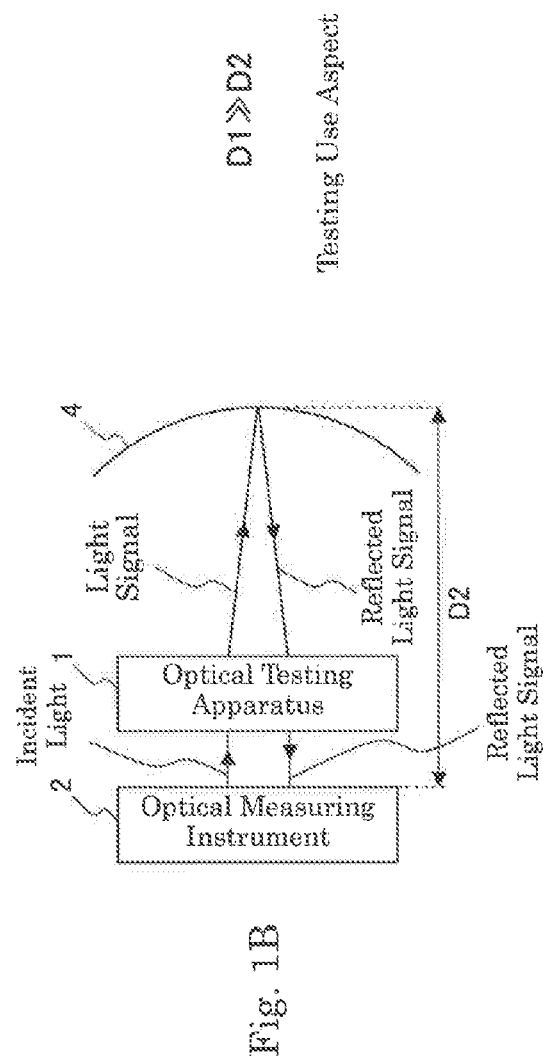
Fig. 1A
Fig. 1B

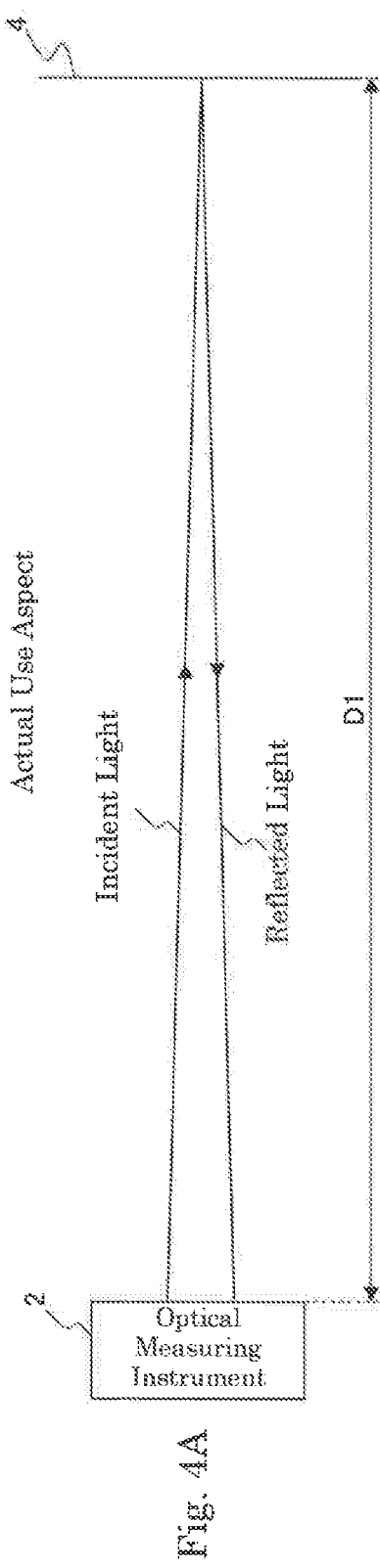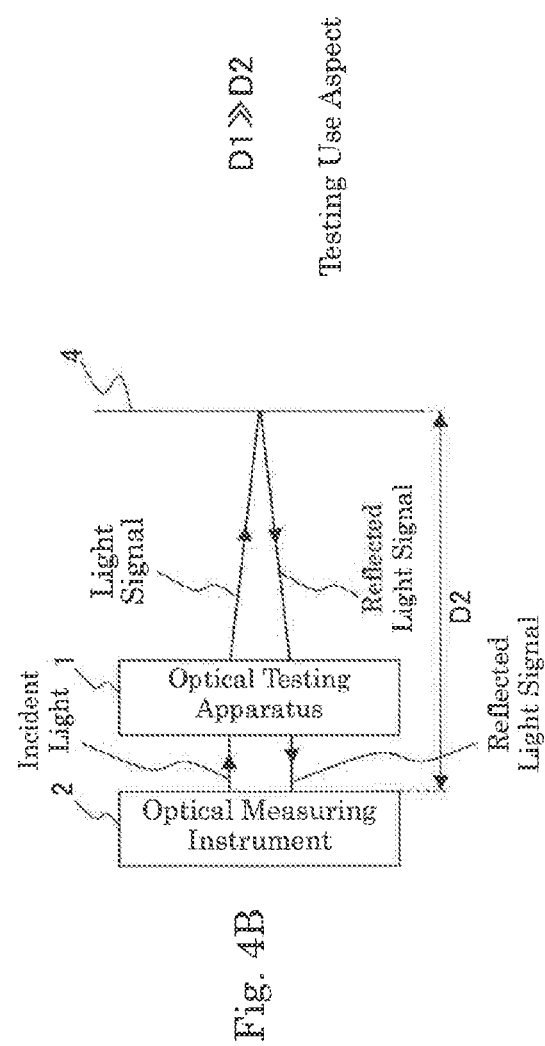
Fig. 4A
Fig. 4B

OPTICAL TESTING APPARATUS

BACKGROUND OF THE INVENTION

Field of the Invention

The present invention relates to testing an instrument arranged to receive reflected light.

Description of the Related Art

There has conventionally been known a distance measuring instrument arranged to provide incident light to a distance measuring object and receive reflected light. The distance between the distance measuring instrument and the distance measuring object is measured (see Japanese Patent Application Publication Nos. 2017-15729, 2006-126168, and 2000-275340, for example).

Such a related art distance measuring instrument as described above is tested with the distance measuring instrument being spaced away from the distance measuring object by a measurement expected distance. For example, if the distance measuring instrument is assumed to be an in-vehicle LiDAR module, the measurement expected distance (hereinafter referred to possibly as "expected distance") is approximately 200 m.

SUMMARY OF THE INVENTION

However, such testing as described above suffers from a problem in that the distance measuring instrument has to be actually spaced away from the distance measuring object by an expected distance. For example, such testing inevitably requires an extensive site (e.g. a square site of 200 m×200 m).

It is hence an object of the present invention to prevent, in testing an instrument arranged to receive reflected light, the distance between the instrument and a measuring object (or an alternative to the measuring object) from increasing.

According to a first aspect of the present invention, an optical testing apparatus for use in testing an optical measuring instrument that provides incident light from a light source to an incident object and receives reflected light due to reflection of the incident light at the incident object, includes: an incident light receiving section that receives incident light; and a light signal providing section that provides a light signal to the incident object after a predetermined delay time since the incident light receiving section has received the incident light, wherein a reflected light signal due to reflection of the light signal at the incident object is provided to the optical measuring instrument, and the delay time is approximately equal to the time between emission of the incident light from the light source and reception of the reflected light by the optical measuring instrument in the case of actually using the optical measuring instrument.

According to the thus constructed first aspect of the present invention, an optical testing apparatus for use in testing an optical measuring instrument that provides incident light from a light source to an incident object and receives reflected light due to reflection of the incident light at the incident object, can be provided. An incident light receiving section receives incident light. A light signal providing section provides a light signal to the incident object after a predetermined delay time since the incident light receiving section has received the incident light. A reflected light signal due to reflection of the light signal at the incident object is provided to the optical measuring instrument. The delay time is approximately equal to the time between emission of the incident light from the light source and reception of the reflected light by the optical measuring instrument in the case of actually using the optical measuring instrument.

According to a second aspect of the present invention, an optical testing apparatus for use in testing an optical measuring instrument that provides incident light from a light source to an incident object and receives reflected light due to reflection of the incident light at the incident object, includes: an incident light receiving section that receives incident light; a light signal providing section that outputs a light signal after a predetermined delay time since the incident light receiving section has received the incident light; and a light traveling direction changing section that emits the light signal toward the optical measuring instrument, wherein a direction changed light signal due to traveling direction change of the light signal at the light traveling direction changing section is provided to the optical measuring instrument, and the delay time is approximately equal to the time between emission of the incident light from the light source and reception of the reflected light by the optical measuring instrument in the case of actually using the optical measuring instrument.

According to the thus constructed second aspect of the present invention, an optical testing apparatus for use in testing an optical measuring instrument that provides incident light from a light source to an incident object and receives reflected light due to reflection of the incident light at the incident object, can be provided. An incident light receiving section receives incident light. A light signal providing section outputs a light signal after a predetermined delay time since the incident light receiving section has received the incident light. A light traveling direction changing section emits the light signal toward the optical measuring instrument. A direction changed light signal due to traveling direction change of the light signal at the light traveling direction changing section is provided to the optical measuring instrument. The delay time is approximately equal to the time between emission of the incident light from the light source and reception of the reflected light by the optical measuring instrument in the case of actually using the optical measuring instrument.

According to the optical testing apparatus of the second aspect of the present invention, the light traveling direction changing section may branch the light signal into two or more emission light beams.

According to a third aspect of the present invention, an optical testing apparatus for use in testing an optical measuring instrument that provides incident light from a light source to an incident object and receives reflected light due to reflection of the incident light at the incident object, includes: an incident light receiving section that receives incident light; and a light signal providing section that provides a light signal to the optical measuring instrument after a predetermined delay time since the incident light receiving section has received the incident light, wherein the delay time is approximately equal to the time between emission of the incident light from the light source and reception of the reflected light by the optical measuring instrument in the case of actually using the optical measuring instrument.

According to the thus constructed third aspect of the present invention, an optical testing apparatus for use in testing an optical measuring instrument that provides incident light from a light source to an incident object and receives reflected light due to reflection of the incident light at the incident object, can be provided. An incident light receiving section receives incident light. A light signal providing section provides a light signal to the optical measuring instrument after a predetermined delay time since the incident light receiving section has received the incident light. The delay time is approximately equal to the time between emission of the incident light from the light source and reception of the reflected light by the optical measuring instrument in the case of actually using the optical measuring instrument.

According to the optical testing apparatus of the first, the second or the third aspect of the present invention, the incident light receiving section may be arranged to convert the incident light into an electrical signal, and the light signal providing section may be arranged to convert the electrical signal delayed by the delay time into the light signal.

According to the first, the second or the third aspect of the present invention, the optical testing apparatus may further include an electrical signal delay section that delays the electrical signal by the delay time.

According to the optical testing apparatus of the first, the second or the third aspect of the present invention, the delay time may be variable in the electrical signal delay section.

According to the optical testing apparatus of the first, the second or the third aspect of the present invention, a plurality of the electrical signal delay sections may have their respective different delay times, and one of the electrical signal delay sections may be selected and used.

According to the optical testing apparatus of the first, the second or the third aspect of the present invention, the incident light receiving section may be arranged to convert the incident light into an electrical signal, and the optical testing apparatus may further include an output control section that causes the light signal providing section to output the light signal based on the electrical signal after the delay time since the incident light receiving section has received the incident light.

According to the optical testing apparatus of the first, the second or the third aspect of the present invention, the light signal providing section may be arranged to delay the incident light by the delay time to generate the light signal.

According to the first, the second or the third aspect of the present invention, the optical testing apparatus may further include an incident light delay section that delays the incident light by the delay time.

According to the optical testing apparatus of the first, the second or the third aspect of the present invention, the incident light delay section may be an optical fiber.

According to the optical testing apparatus of the first, the second or the third aspect of the present invention, the incident light delay section may be a multi-reflection cell.

According to the optical testing apparatus of the first, the second or the third aspect of the present invention, the incident light delay section may be a multi-reflection fiber.

According to the first, the second or the third aspect of the present invention, the optical testing apparatus may further include an optical attenuator that attenuates the power of the light signal, wherein the degree of attenuation may be variable in the optical attenuator.

According to the optical testing apparatus of the first, the second or the third aspect of the present invention, the incident object may have a variable reflectance.

According to the present invention, a semiconductor testing apparatus may include: the optical testing apparatus according to the first, the second or the third aspect of the present invention; and a testing section that conducts a test on measurements using the optical measuring instrument.

BRIEF DESCRIPTION OF THE DRAWINGS

FIGS. 1A and 1B show an actual use aspect (FIG. 1A) and a testing use aspect (FIG. 1B) of an optical measuring instrument 2;

FIGS. 4A and 4B show an actual use aspect (FIG. 4A) and a testing use aspect (FIG. 4B) of an optical measuring instrument 2 according to a second variation of the first embodiment of the present invention;

DESCRIPTION OF THE PREFERRED EMBODIMENTS

Preferred embodiments of the present invention will hereinafter be described with reference to the accompanying drawings.

First Embodiment

Figure 2:
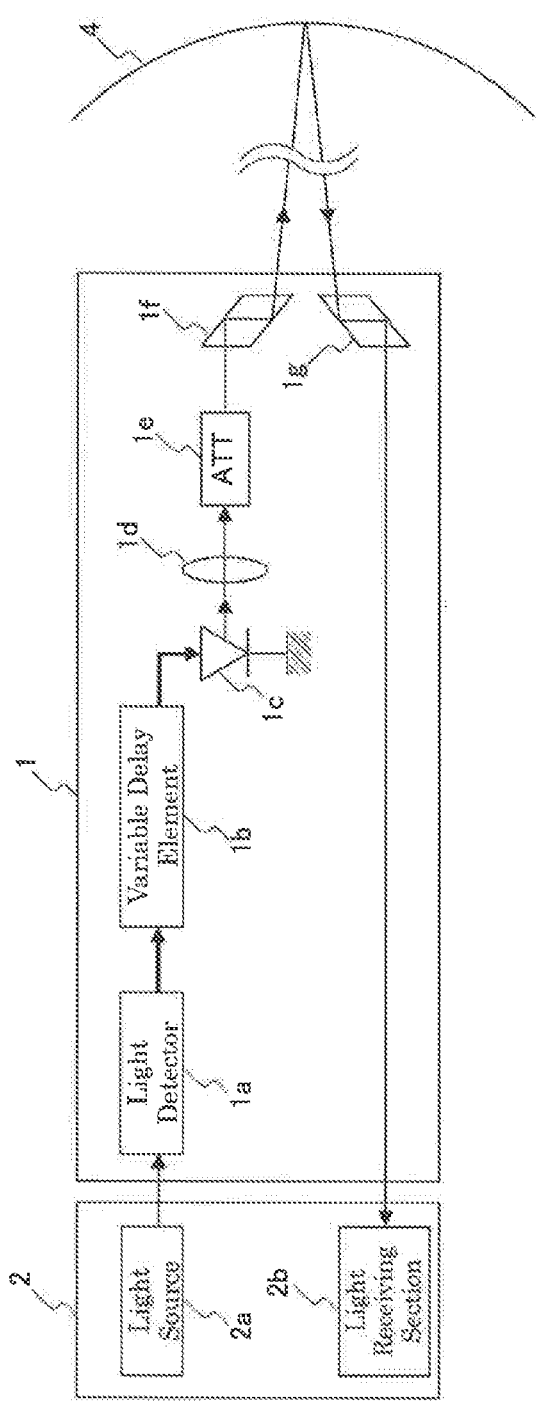
FIG. 2 is a functional block diagram showing the configuration of an optical testing apparatus 1 according to a first embodiment of the present invention.

FIG. 1 shows an actual use aspect (FIG. 1A) and a testing use aspect (FIG. 1B) of an optical measuring instrument 2. FIG. 2 is a functional block diagram showing the configuration of an optical testing apparatus 1 according to a first embodiment of the present invention.

Referring to FIG. 1A, in the actual use aspect, the optical measuring instrument 2 provides incident light from a light source 2a (see FIG. 2) to an incident object 4. The incident light is reflected at the incident object 4 to be reflected light and received by the light receiving section 2b (see FIG. 2) of the optical measuring instrument 2. The optical measuring instrument 2 is, for example, a LiDAR module and used to measure the distance D1 between the optical measuring instrument 2 and the incident object 4. It is noted that if the optical measuring instrument 2 is a LiDAR module, the distance D1 is, for example, 200 m.

Measuring the distance D1 may include the steps of (1) measuring the time between emission of incident light from the light source 2a and reception of reflected light by the optical measuring instrument 2 and (2) multiplying the time measured in step (1) by the speed of light and then ½ to obtain the distance D1. Note that in the embodiments of the present invention, the steps (1) and (2) above should be performed in a module different from the optical measuring instrument 2 (see FIG. 15).

It is noted that the incident object 4 is, for example, a reflector.

Referring to FIG. 1B, the optical testing apparatus 1 is used to test the optical measuring instrument 2. The testing is intended to, for example, check whether or not the optical measuring instrument 2 can accurately measure the distance D1.

In the testing use aspect, the optical testing apparatus 1 is disposed between the optical measuring instrument 2 and the incident object 4. The distance D2 between the optical measuring instrument 2 and the incident object 4 is much smaller than the distance D1 and is, for example, 1 m.

Incident light from the light source 2a (see FIG. 2) of the optical measuring instrument 2 is provided to the optical testing apparatus 1 and a light signal is provided to the incident object 4. The light signal is reflected at the incident object 4 to be a reflected light signal and passes through the optical testing apparatus 1 to be received by the light receiving section 2b (see FIG. 2) of the optical measuring instrument 2.

It is noted that the optical testing apparatus 1 and the optical measuring instrument 2 may be put in a constant temperature reservoir (the same applies to the other embodiments).

Referring to FIG. 2, the optical testing apparatus 1 according to the first embodiment includes a light detector (incident light receiving section) 1a, a variable delay element (electrical signal delay section) 1b, a laser diode (light signal providing section) 1c, a lens 1d, an optical attenuator 1e, and Galvano mirrors 1f, 1g.

The light detector (incident light receiving section) 1a is arranged to receive incident light and convert it into an electrical signal. The light detector 1a is, for example, a photodetector.

The variable delay element (electrical signal delay section) 1b is arranged to delay an electrical signal output from the light detector 1a by a predetermined delay time. Note that the delay time is approximately equal to the time between emission of incident light from the light source 2a and reception of reflected light by the optical measuring instrument 2 (i.e. 2×D1/c) in the case of actually using the optical measuring instrument 2 (see FIG. 1A), where c is the speed of light. It is noted that if D1 is 200 m, 2×D1/c is about 1332 nanoseconds.

Note that the delay time may be 2×D1/c (falling within "approximately equal"). The delay time may also be 2×(D1−D2)/c. If the delay time is 2×(D1−D2)/c, which differs from 2×D1/c, the delay time is "approximately" equal to 2×D1/c because D2 is much smaller than D1.

It is noted that the delay time is variable in the variable delay element (electrical signal delay section) 1b. This allows for scaling with a change in the distance D1 in the case of actually using the optical measuring instrument 2.

The laser diode (light signal providing section) 1c is arranged to convert an output from the variable delay element 1b (i.e. an electrical signal output from the light detector 1a delayed by a predetermined delay time) into a light signal (e.g. a laser beam). Note that a driver circuit (not shown) may be connected between the laser diode 1c and the variable delay element 1b to provide an output from the variable delay element 1b to the laser diode 1c via the driver circuit. In this case, the driver circuit amplifies and provides an output current from the variable delay element 1b to the laser diode 1c as a current high enough to drive the laser diode 1c. Even in this case, the laser diode 1c remains to convert an output from the variable delay element 1b into a light signal (the same applies to the second and third embodiments). This allows the laser diode 1c to provide a light signal to the incident object 4 after a predetermined delay time since the light detector 1a has received incident light. It should be noted that the time between reception of incident light by the light detector 1a and provision of an electrical signal to the variable delay element 1b is approximately zero.

The lens 1d is a convex lens arranged to receive a light signal output from the laser diode 1c.

The optical attenuator 1e is arranged to attenuate the power of a light signal penetrating through the lens 1d and provide it to the Galvano mirror 1f. The degree of attenuation is variable. Thus attenuating the power of a light signal allows for testing in a model case where the power of incident light output from the light source 2a of the optical measuring instrument 2 is low.

The Galvano mirror 1f is arranged to receive an output from the optical attenuator 1e and provide a light signal to approximately the center of the incident object 4. The light signal is reflected at the incident object 4 to be a reflected light signal.

The Galvano mirror 1g is arranged to redirect the optical path of a reflected light signal toward the light receiving section 2b and then provide the reflected light signal therethrough to the light receiving section 2b of the optical measuring instrument 2.

It is noted that without using the Galvano mirrors 1f, 1g, the optical attenuator 1e may be placed on a stage movable in two orthogonal axial directions (XY directions) or a stage angularly tiltable with respect to the incident object 4.

Next will be described an operation according to the first embodiment.

In order to test whether or not the optical measuring instrument 2 can accurately measure the distance D1, the optical testing apparatus 1 is first disposed between the optical measuring instrument 2 and the incident object 4 (see FIG. 1B).

Incident light from the light source 2a of the optical measuring instrument 2 is provided to the light detector 1a of the optical testing apparatus 1. The incident light is converted through the light detector 1a into an electrical signal and provided to the variable delay element 1b. The electrical signal is delayed by a delay time approximately equal to 2×D1/c (e.g. 2×D1/c or 2×(D1−D2)/c) and provided to the laser diode 1c. The output from the variable delay element 1b is converted through the laser diode 1c into a light signal. The light signal passes through the lens 1d, the optical attenuator 1e, and the Galvano mirror 1f to be provided to approximately the center of the incident object 4. The light signal is reflected at the incident object 4 to be a reflected light signal.

The optical path of the reflected light signal is redirected by the Galvano mirror 1g toward the light receiving section 2b. The reflected light signal passes through the Galvano mirror 1g to be provided to the light receiving section 2b of the optical measuring instrument 2.

In accordance with the first embodiment, after a predetermined delay time since the light detector (incident light receiving section) 1a has received incident light (approximately equal to the time between emission of the incident light from the light source 2a and reception of reflected light by the optical measuring instrument 2 in the case of actually using the optical measuring instrument 2 (see FIG. 1A)) (e.g. 2×D1/c or 2×(D1−D2)/c), the laser diode (light signal providing section) 1e provides a light signal to the incident object 4. This allows the distance D2 between the optical measuring instrument 2 and the measuring object 4 in testing the optical measuring instrument 2 (see FIG. 1B) to be smaller than in a situation where the optical measuring instrument 2 is expected to be used (distance D1; see FIG. 1A), which can prevent the distance D2 from increasing.

If the optical testing apparatus 1 is not disposed and the optical measuring instrument 2 and the incident object 4 are disposed with being spaced away from each other by the distance D2, the time between emission of incident light from the light source 2a and reception of reflected light by the optical measuring instrument 2 is 2×D2/c (approximately zero). The measurement result of the distance between the optical measuring instrument 2 and the incident object 4 is therefore D2. This cannot test whether or not the optical measuring instrument 2 can accurately measure the distance D1.

However, the optical testing apparatus 1, if disposed between the optical measuring instrument 2 and the incident object 4 (see FIG. 1B), causes delay therein by a delay time approximately equal to 2×D1/c. This causes the time Δt between emission of incident light from the light source 2a and reception of reflected light by the optical measuring instrument 2 to be approximately equal to 2×D1/c. For example, if the delay time is 2×D1/c, Δt=2×D1/c+2×D2/c, where D2 is much smaller than D1 and thereby 2×D2/c can be ignored, resulting in Δt=2×D1/c. On the other hand, if the delay time is 2×(D1−D2)/c, Δt=2×(D1−D2)/c+2×D2/c=2×D1/c. Whichever the case, since Δt=2×D1/c shows that the measurement result of the distance between the optical measuring instrument 2 and the incident object 4 is D1, it is possible to test whether or not the optical measuring instrument 2 can accurately measure the distance D1.

Figure 3:
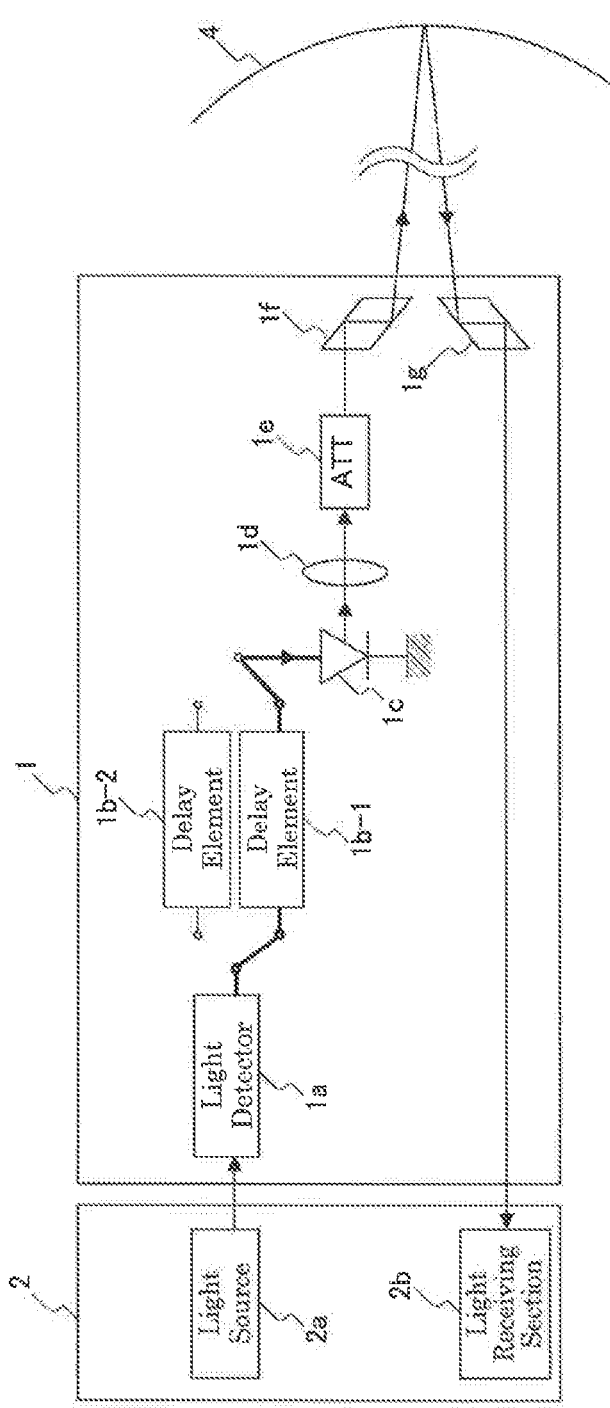
FIG. 3 is a functional block diagram showing the configuration of an optical testing apparatus 1 according to a first variation of the first embodiment of the present invention.

It is noted that the optical testing apparatus 1 according to the first embodiment can have the following variations.
First Variation FIG. 3 is a functional block diagram showing the configuration of an optical testing apparatus 1 according to a first variation of the first embodiment of the present invention.

The optical testing apparatus 1 according to the first variation of the first embodiment of the present invention includes delay elements 1b-1, 1b-2 in place of the variable delay element 1b according to the first embodiment.

The delay elements 1b-1, 1b-2 have their respective different delay times (provided that the delay times are not variable but constant), one of which is to be selected and used. In the example of FIG. 3, the delay element 1b-1 is selected and used. The example of FIG. 3 can support the case where there are two distances D1 in the case of actually using the optical measuring instrument 2.

It is noted that in the optical testing apparatus 1 according to the first variation, the number of delay elements is not limited to two, but may be three or more. Note that a driver circuit (not shown) may be connected to the input of the laser diode 1c to provide an output from the delay element 1b-1 or 1b-2 to the laser diode 1c via the driver circuit. In this case, the driver circuit amplifies and provides an output current from the delay element 1b-1 or 1b-2 to the laser diode 1c as a current high enough to drive the laser diode 1c. Even in this case, the laser diode 1c remains to convert an output from the delay element 1b-1 or 1b-2 into a light signal (the same applies to the variations of the second and third embodiments).
Second Variation FIG. 4 shows an actual use aspect (FIG. 4A) and a testing use aspect (FIG. 4B) of an optical measuring instrument 2 according to a second variation of the first embodiment of the present invention.

The optical testing apparatus 1 according to the second variation of the first embodiment of the present invention differs from that of the first embodiment in that the incident object 4 is a flat plate. It is noted that the incident object 4 according to the second variation may have a variable reflectance. For example, employing liquid crystal as the incident object 4 and changing colors provides reflectance variability.

It is noted that variations similar to the second variation apply to the fourth and seventh embodiments.

Second Embodiment

The optical testing apparatus 1 according to a second embodiment differs from that of the first embodiment in that an optical coupler (light traveling direction changing section) 5 is used in place of the incident object 4.

The actual use aspect and the testing use aspect of the optical measuring instrument 2 according to the second embodiment are the same as those of the first embodiment and will not be described (see FIG. 1; note that the optical coupler 5 is used in place of the incident object 4). Note that the optical coupler 5 should be included in the optical testing apparatus 1 (see FIG. 5).

Figure 5:
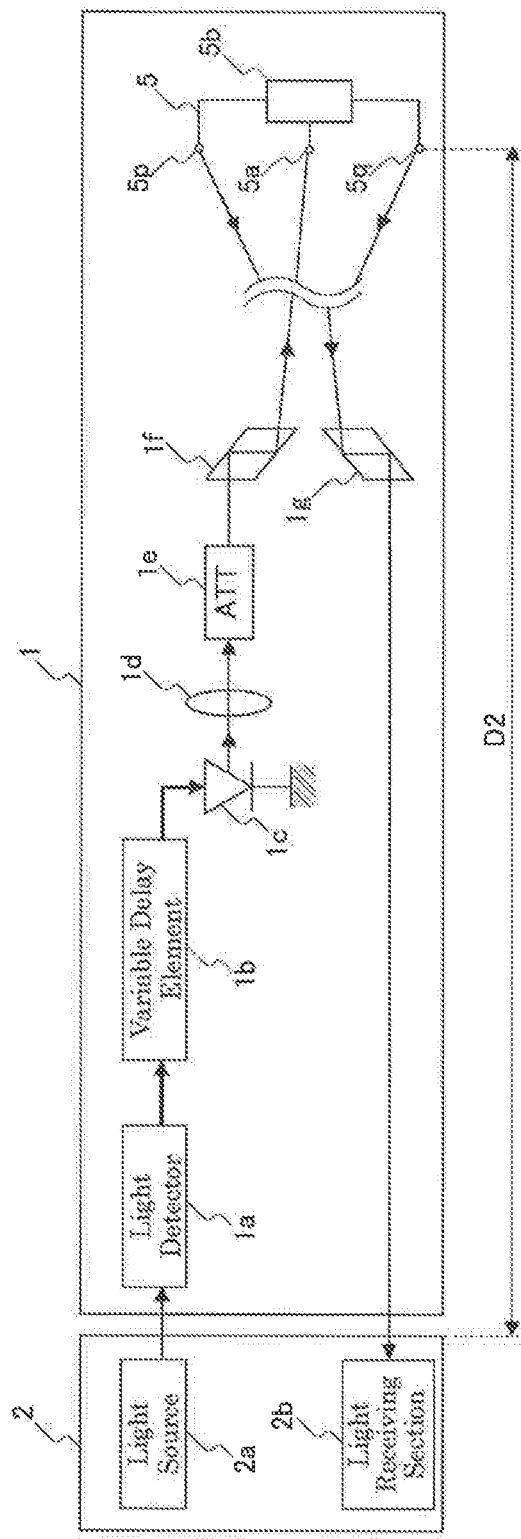
FIG. 5 is a functional block diagram showing the configuration of the optical testing apparatus 1 according to the second embodiment of the present invention.

FIG. 5 is a functional block diagram showing the configuration of the optical testing apparatus 1 according to the second embodiment of the present invention. The optical testing apparatus 1 according to the second embodiment includes a light detector (incident light receiving section) 1a, a variable delay element (electrical signal delay section) 1b, a laser diode (light signal providing section) 1c, a lens 1d, an optical attenuator 1e, Galvano mirrors 1f, 1g, and an optical coupler (light traveling direction changing section) 5. The optical coupler 5 has an input port 5a, an optical branch section 6b, and output ports 5p, 5q. Components identical to those in the first embodiment will be designated by the same symbols to omit the description thereof.

The light detector (incident light receiving section) 1a, the variable delay element (electrical signal delay section) 1b, the lens 1d, and the optical attenuator 1e are the same as those in the first embodiment and will not be described.

The laser diode (light signal providing section) 1c is approximately the same as that in the first embodiment, except that it outputs and provides a light signal to the optical coupler 5.

The Galvano mirror 1f is approximately the same as that in the first embodiment, except that it provides a light signal to the input port 5a of the optical coupler 5. The light signal is branched through the optical branch section 5b into two or more emission light beams, which are then output at the respective output ports 5p, 5q. Light beams output from the output ports 5p, 5q are called direction changed light signal. A direction changed light signal is a result of a change in the traveling direction of a light signal through the optical coupler 5 and arranged to be emitted from the optical coupler 5 toward the optical measuring instrument 2.

The Galvano mirror 1g is arranged to redirect the optical path of a direction changed light signal toward the light receiving section 2b and then provide the direction changed light signal therethrough to the light receiving section 2b of the optical measuring instrument 2.

It is noted that the distance between the Galvano mirror 1g and the output ports 5p, 5q is large enough to approximately equate the line segment between the Galvano mirror 1g and the output port 5p with the line segment between the Galvano mirror 1g and the output port 5q. Accordingly the optical path of a direction changed light signal output from the output port 5p can be equated with the optical path of a direction changed light signal output from the output port 5q in the vicinity of the Galvano mirror 1g.

Next will be described an operation according to the second embodiment.

In order to test whether or not the optical measuring instrument 2 can accurately measure the distance D1, the optical testing apparatus 1 having the optical coupler 5 is first disposed in front of the optical measuring instrument 2.

Incident light from the light source 2a of the optical measuring instrument 2 is provided to the light detector 1a of the optical testing apparatus 1. The incident light is converted through the light detector 1a into an electrical signal and provided to the variable delay element 1b. The electrical signal is delayed by a delay time approximately equal to 2×D1/c (e.g. 2×D1/c or 2×(D1−D2)/c) and provided to the laser diode 1c. The output from the variable delay element 1b is converted through the laser diode 1c into a light signal. The light signal passes through the lens 1d, the optical attenuator 1e, and the Galvano mirror 1f to be provided to the input port 5a of the optical coupler 5. The light signal changes its traveling direction through the optical coupler 5 to be a direction changed light signal and then emitted from the output ports 5p, 5q toward the optical measuring instrument 2.

The optical path of the direction changed light signal is redirected by the Galvano mirror 1g toward the light receiving section 2b. The direction changed light signal passes through the Galvano mirror 1g to be provided to the light receiving section 2b of the optical measuring instrument 2.

The second embodiment exhibits the same advantageous effects as the first embodiment. That is, the distance D2 between the optical measuring instrument 2 and the optical coupler 5 (in place of the measuring object 4) in testing the optical measuring instrument 2 (see FIG. 5; note that the distance D2 has the same length as in the first embodiment) to be smaller than in a situation where the optical measuring instrument 2 is expected to be used (distance D1; see FIG. A), which can prevent the distance D2 from increasing.

It is noted that the optical testing apparatus 1 according to the second embodiment can have the following variation.

Figure 6:
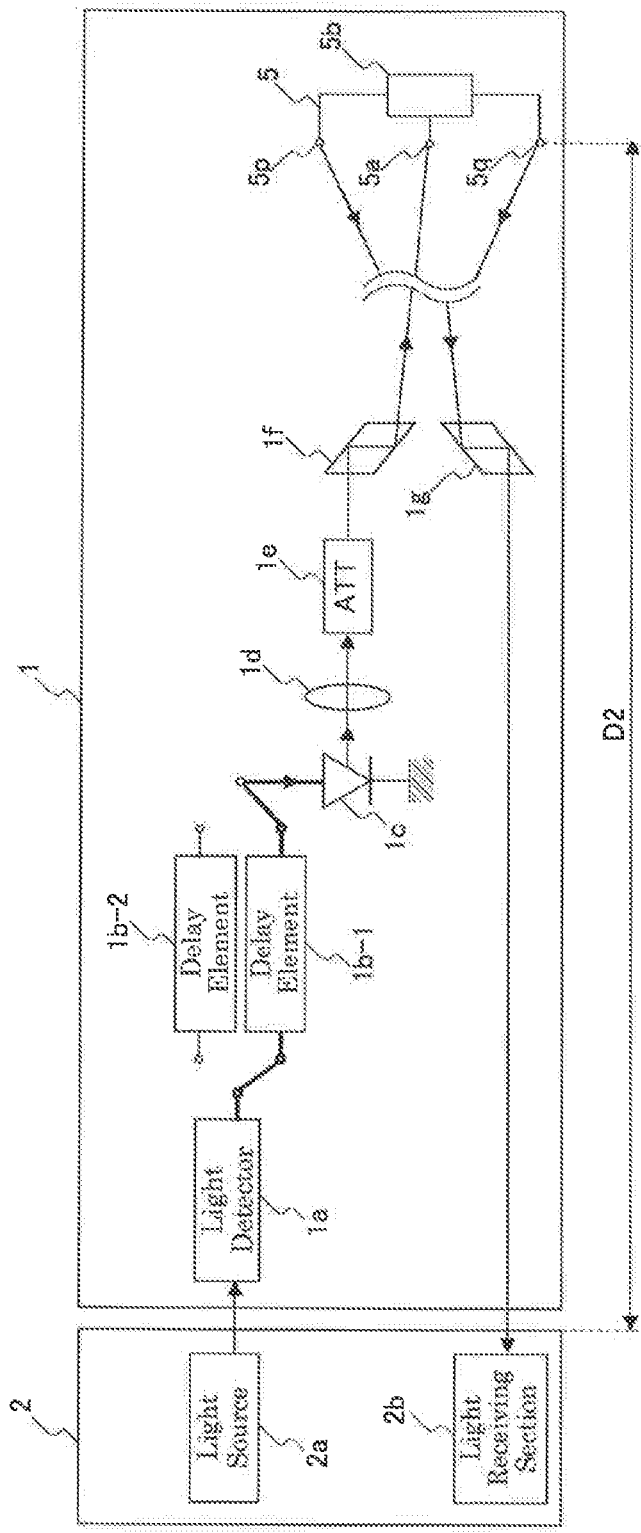
FIG. 6 is a functional block diagram showing the configuration of an optical testing apparatus 1 according to a variation of the second embodiment of the present invention.

FIG. 6 is a functional block diagram showing the configuration of an optical testing apparatus 1 according to a variation of the second embodiment of the present invention.

The optical testing apparatus 1 according to the variation of the second embodiment of the present invention includes delay elements 1b-1, 1b-2 in place of the variable delay element 1b according to the second embodiment.

The delay elements 1b-1, 1b-2 have their respective different delay times (provided that the delay times are not variable but constant), one of which is to be selected and used. In the example of FIG. 6, the delay element 1b-1 is selected and used. The example of FIG. 6 can support the case where there are two distances D1 in the case of actually using the optical measuring instrument 2.

It is noted that in the optical testing apparatus 1 according to the variation above, the number of delay elements is not limited to two, but may be three or more.

Third Embodiment

The optical testing apparatus 1 according to a third embodiment differs from that of the first embodiment in that the incident object 4 is not used.

The actual use aspect of the optical measuring instrument 2 according to the third embodiment is the same as that of the first embodiment and will not be described (see FIG. A). In the testing use aspect of the optical measuring instrument 2 according to the third embodiment, the optical measuring instrument 2 and the optical testing apparatus 1 are used, while neither the reflecting object 4 nor the optical coupler 5 is used (see FIG. 7).

Figure 7:
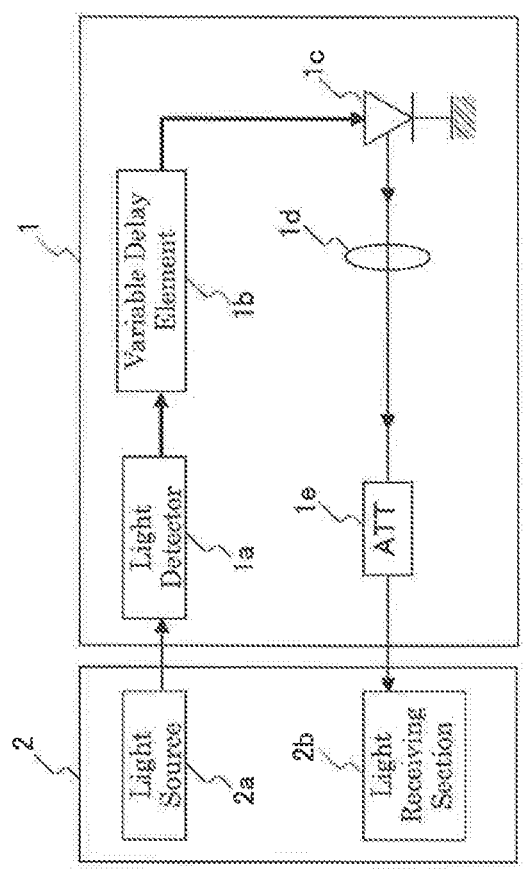
FIG. 7 is a functional block diagram showing the configuration of the optical testing apparatus 1 according to the third embodiment of the present invention.

FIG. 7 is a functional block diagram showing the configuration of the optical testing apparatus 1 according to the third embodiment of the present invention. Referring to FIG. 7, the optical testing apparatus 1 according to the third embodiment includes a light detector (incident light receiving section) 1a, a variable delay element (electrical signal delay section) 1b, a laser diode (light signal providing section) c, a lens 1d, and an optical attenuator 1e.

The light detector (incident light receiving section) 1a, the variable delay element (electrical signal delay section) 1b, and the lens 1d are the same as those in the first embodiment and will not be described.

The laser diode (light signal providing section) 1c is approximately the same as that in the first embodiment, except that it outputs and provides a light signal to the optical measuring instrument 2.

The optical attenuator 1e is approximately the same as that in the first embodiment, except that it provides a light signal to the light receiving section 2b of the optical measuring instrument 2.

Next will be described an operation according to the third embodiment.

In order to test whether or not the optical measuring instrument 2 can accurately measure the distance D1, the optical testing apparatus 1 is first disposed in front of the optical measuring instrument 2.

Incident light from the light source 2a of the optical measuring instrument 2 is provided to the light detector 1a of the optical testing apparatus 1. The incident light is converted through the light detector 1a into an electrical signal and provided to the variable delay element 1b. The electrical signal is delayed by a delay time approximately equal to 2×D1/c and provided to the laser diode 1c. The output from the variable delay element 1b is converted through the laser diode 1c into alight signal. The light signal passes through the lens 1d and the optical attenuator 1e to be provided to the light receiving section 2b of the optical measuring instrument 2.

The third embodiment exhibits the same advantageous effects as the first embodiment. That is, since neither the measuring object 4 nor the optical coupler 5 (in place of the measuring object 4) is used in testing the optical measuring instrument 2, the distance D2 between the optical measuring instrument 2 and the measuring object 4 (or an alternative thereto) cannot exist, which can prevent the distance D2 from increasing.

It is noted that the optical testing apparatus 1 according to the third embodiment can have the following variation.

Figure 8:
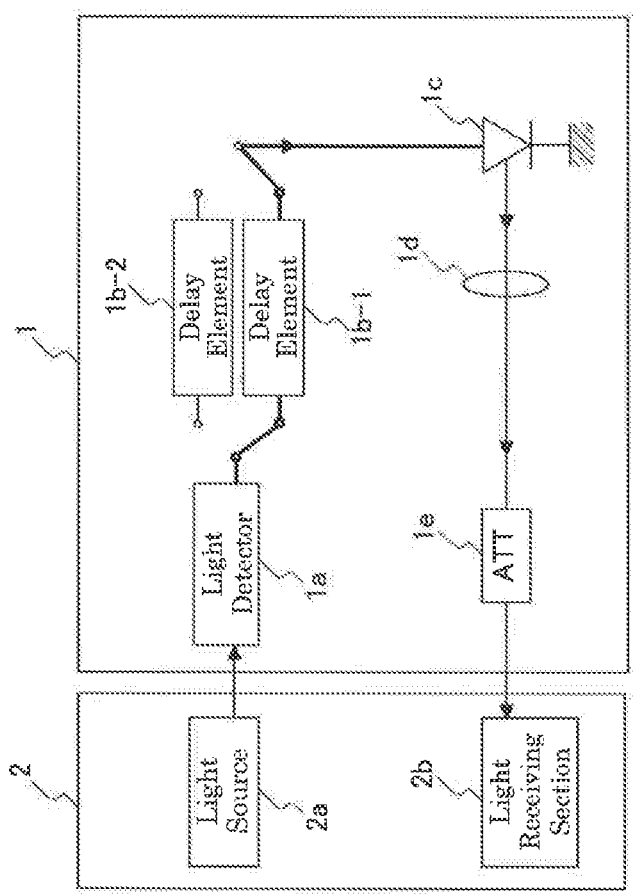
FIG. 8 is a functional block diagram showing the configuration of an optical testing apparatus 1 according to a variation of the third embodiment of the present invention.

FIG. 8 is a functional block diagram showing the configuration of an optical testing apparatus 1 according to a variation of the third embodiment of the present invention.

The optical testing apparatus 1 according to the variation of the third embodiment of the present invention includes delay elements 1b-1, 1b-2 in place of the variable delay element 1b according to the third embodiment.

The delay elements 1b-1, 1b-2 have their respective different delay times (provided that the delay times are not variable but constant), one of which is to be selected and used. In the example of FIG. 8, the delay element 1b-1 is selected and used. The example of FIG. 8 can support the case where there are two distances D1 in the case of actually using the optical measuring instrument 2.

It is noted that in the optical testing apparatus 1 according to the variation above, the number of delay elements is not limited to two, but may be three or more.

Fourth Embodiment

The optical testing apparatus 1 according to a fourth embodiment differs from that of the first embodiment in that an IC 1i is used.

The actual use aspect and the testing use aspect of the optical measuring instrument 2 according to the fourth embodiment are the same as those of the first embodiment and will not be described (see FIG. 1).

Figure 9:
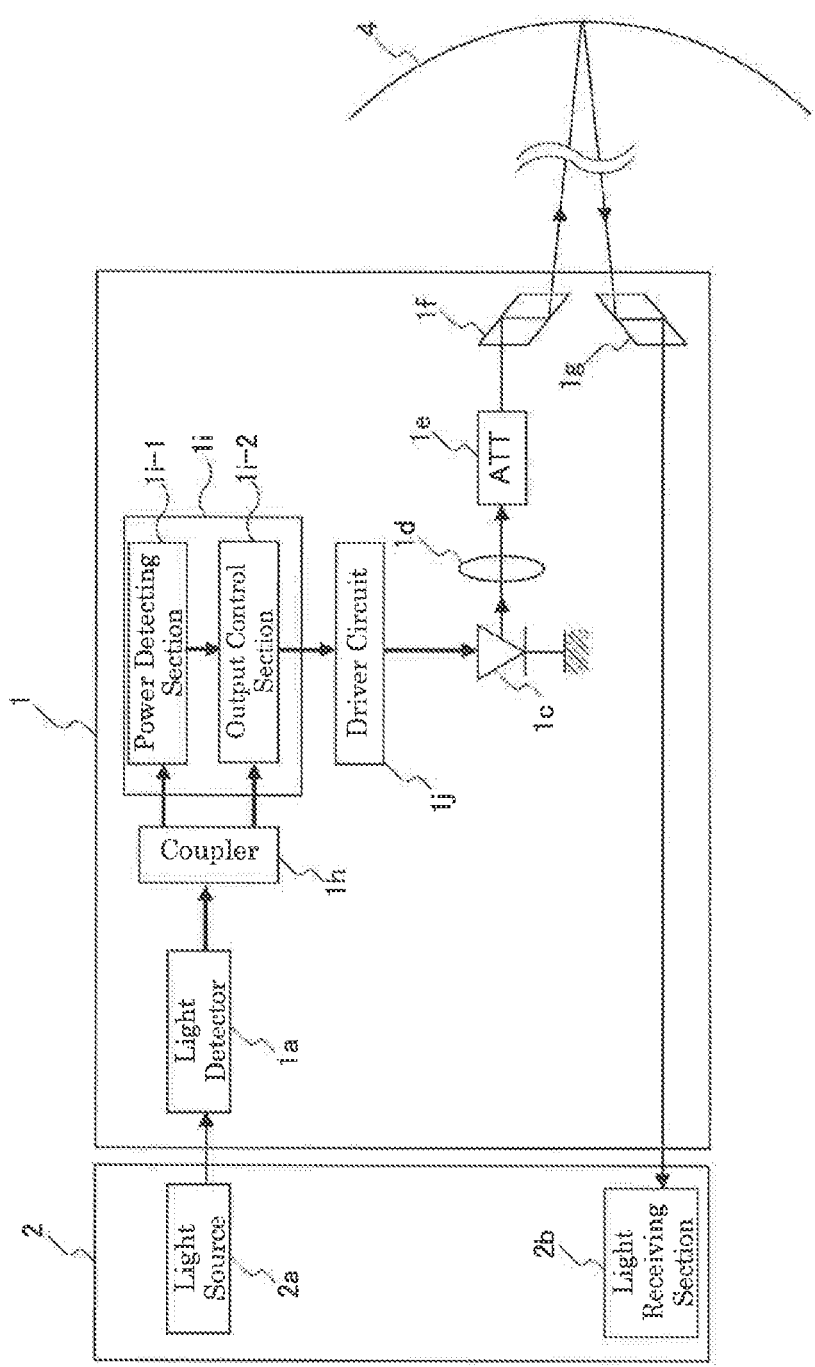
FIG. 9 is a functional block diagram showing the configuration of the optical testing apparatus 1 according to the fourth embodiment of the present invention.

FIG. 9 is a functional block diagram showing the configuration of the optical testing apparatus 1 according to the fourth embodiment of the present invention. The optical testing apparatus 1 according to the fourth embodiment includes a light detector (incident light receiving section) 1a, a laser diode (light signal providing section) 1c, a lens 1d, an optical attenuator 1e, Galvano mirrors 1f, 1g, an optical coupler 1h, an IC 1i, and a driver circuit 1j. Components identical to those in the first embodiment will be designated by the same symbols to omit the description thereof.

The light detector (incident light receiving section) 1a, the lens 1d, the optical attenuator 1e, and the Galvano mirrors 1f, 1g are the same as those in the first embodiment and will not be described.

The optical coupler 1h is arranged to branch an electrical signal output from the light detector 1a into two signals and provide them to a power detecting section 1i-1 and an output control section 1i-2 of the IC 1i.

The IC 1i is an integrated circuit having the power detecting section 1i-1 and the output control section 1i-2.

The power detecting section 1i-1 is arranged to receive an electrical signal and determine whether or not the power of incident light is within a predetermined range. The power detecting section 1i-1 is arranged to activate the output control section 1i-2 if the power of incident light is within the predetermined range. The output control section 1i-2 is arranged to receive an electrical signal and activate the driver circuit 1j after a predetermined delay time (as in the first embodiment).

The driver circuit 1j is arranged to activate the laser diode 1c. The laser diode (light signal providing section) 1c is arranged to output a light signal (e.g. a laser beam).

It is noted that both the time between reception of incident light by the light detector (incident light receiving section) 1a and activation of the output control section 1i-2 and the time between activation of the driver circuit 1j and output of a light signal from the laser diode 1c are approximately zero. The output control section 1i-2 thus causes, based on an electrical signal, the laser diode (light signal providing section) 1c to output a light signal after a predetermined delay time since the light detector (incident light receiving section) 1a has received incident light.

Next will be described an operation according to the fourth embodiment.

In order to test whether or not the optical measuring instrument 2 can accurately measure the distance D1, the optical testing apparatus 1 is first disposed between the optical measuring instrument 2 and the incident object 4 (see FIG. 1B).

Incident light from the light source 2a of the optical measuring instrument 2 is provided to the light detector 1a of the optical testing apparatus 1. The incident light is converted through the light detector 1a into an electrical signal and provided via the optical coupler 1h to the power detecting section 1i-1 and the output control section 1i-2 of the IC 1i.

When the power detecting section 1i-1 receives the electrical signal and activates the output control section 1i-2, the output control section 1i-2 delays the electrical signal by a delay time approximately equal to 2×D1/c (e.g. 2×D1/c or 2×(D1−D2)/c) and provides it to the driver circuit 1j. When the driver circuit 1j activates the laser diode 1c, the laser diode 1c outputs a light signal. The light signal passes through the lens 1d, the optical attenuator 1e, and the Galvano mirror 1f to be provided to approximately the center of the incident object 4. The light signal is reflected at the incident object 4 to be a reflected light signal.

The optical path of the reflected light signal is redirected by the Galvano mirror 1g toward the light receiving section 2b. The reflected light signal passes through the Galvano mirror 1g to be provided to the light receiving section 2b of the optical measuring instrument 2.

The fourth embodiment exhibits the same advantageous effects as the first embodiment.

Fifth Embodiment

The optical testing apparatus 1 according to a fifth embodiment differs from that of the second embodiment in that an IC 1i is used.

The actual use aspect and the testing use aspect of the optical measuring instrument 2 according to the fifth embodiment are the same as those of the second embodiment and will not be described (see FIG. 1; note that the optical coupler 5 is used in place of the incident object 4). Note that the optical coupler 5 should be included in the optical testing apparatus 1 (see FIG. 10).

Figure 10:
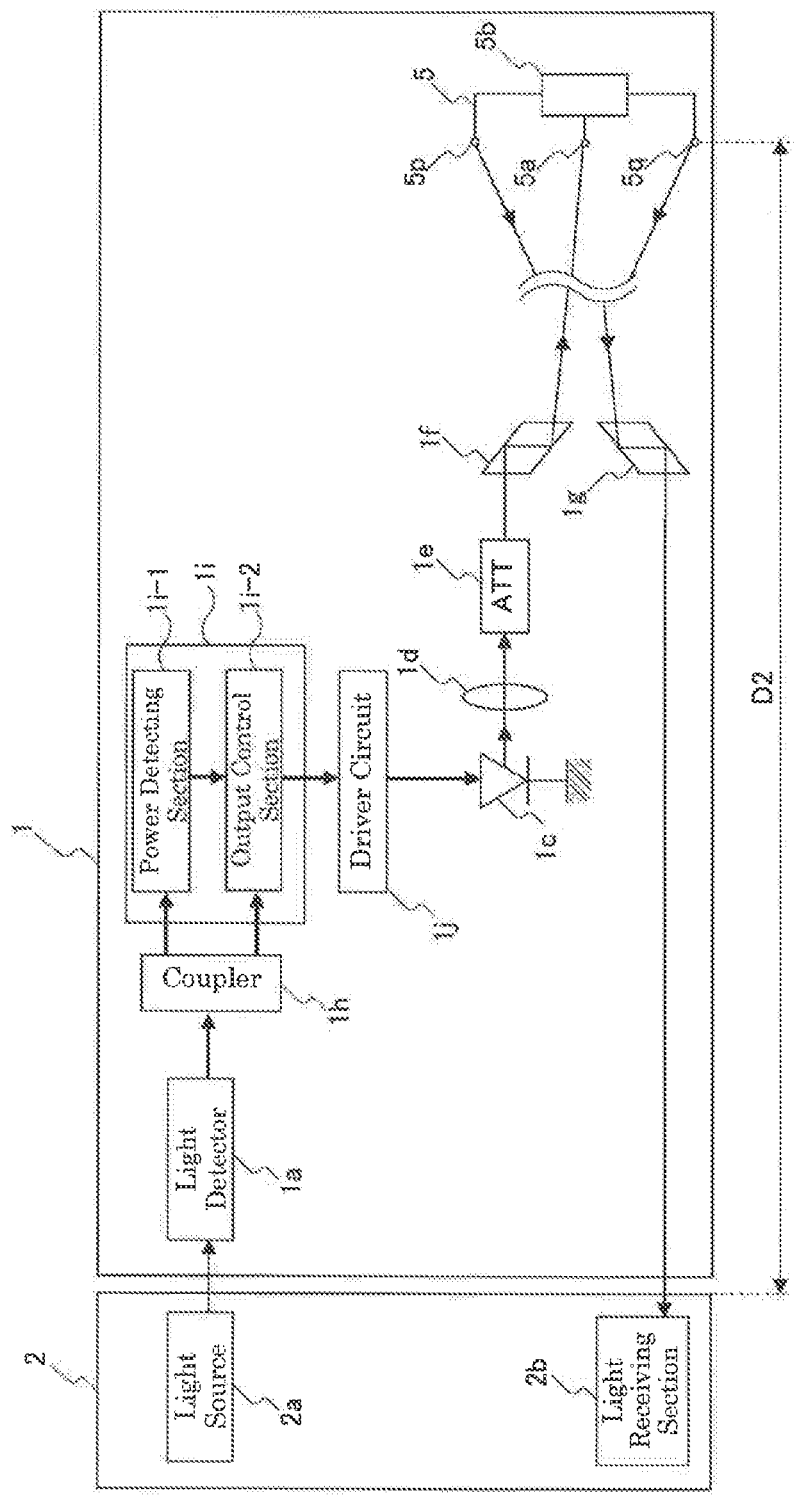
FIG. 10 is a functional block diagram showing the configuration of the optical testing apparatus 1 according to the fifth embodiment of the present invention.

FIG. 10 is a functional block diagram showing the configuration of the optical testing apparatus 1 according to the fifth embodiment of the present invention. The optical testing apparatus 1 according to the fifth embodiment includes a light detector (incident light receiving section) 1a, a laser diode (light signal providing section) 1c, a lens 1d, an optical attenuator 1e, Galvano mirrors 1f, 1g, an optical coupler 1h, an IC 1i, a driver circuit 1j, and an optical coupler (light traveling direction changing section) 5. The optical coupler 5 has an input port 5a, an optical branch section 5b, and output ports 5p, 5q. Components identical to those in the second embodiment will be designated by the same symbols to omit the description thereof.

The light detector (incident light receiving section) 1a, the lens 1d, the optical attenuator 1e, the Galvano mirrors 1f, 1g, and the optical coupler 5 are the same as those in the second embodiment and will not be described.

The optical coupler 1h is arranged to branch an electrical signal output from the light detector 1a into two signals and provide them to a power detecting section 1i-1 and an output control section 1i-2 of the IC 1i.

The IC 1i is an integrated circuit having the power detecting section 1i-1 and the output control section 1i-2.

The power detecting section 1i-1 is arranged to receive an electrical signal and determine whether or not the power of incident light is within a predetermined range. The power detecting section 1i-1 is arranged to activate the output control section 1i-2 if the power of incident light is within the predetermined range. The output control section 1i-2 is arranged to receive an electrical signal and activate the driver circuit 1j after a predetermined delay time (as in the first embodiment).

The driver circuit 1j is arranged to activate the laser diode 1c.

The laser diode (light signal providing section) 1c is arranged to output a light signal (e.g. a laser beam).

It is noted that both the time between reception of incident light by the light detector (incident light receiving section) 1a and activation of the output control section 1i-2 and the time between activation of the driver circuit 1j and output of a light signal from the laser diode 1c are approximately zero. The output control section 1i-2 thus causes, based on an electrical signal, the laser diode (light signal providing section) 1e to output a light signal after a predetermined delay time since the light detector (incident light receiving section) 1a has received incident light.

Next will be described an operation according to the fifth embodiment.

In order to test whether or not the optical measuring instrument 2 can accurately measure the distance D1, the optical testing apparatus 1 having the optical coupler 5 is first disposed in front of the optical measuring instrument 2.

Incident light from the light source 2a of the optical measuring instrument 2 is provided to the light detector 1a of the optical testing apparatus 1. The incident light is converted through the light detector 1a into an electrical signal and provided via the optical coupler 1h to the power detecting section 1i-1 and the output control section 1i-2 of the IC 1i.

When the power detecting section 1i-1 receives the electrical signal and activates the output control section 1i-2, the output control section 1i-2 delays the electrical signal by a delay time approximately equal to 2×D1/c (e.g. 2×D1/c or 2×(D1−D2)/c) and provides it to the driver circuit 1j. When the driver circuit 1j activates the laser diode 1c, the laser diode 1c outputs a light signal. The light signal passes through the lens 1d, the optical attenuator 1e, and the Galvano mirror 1f to be provided to the input port 5a of the optical coupler 5. The light signal changes its traveling direction through the optical coupler 5 to be a direction changed light signal and then emitted from the output ports 5p, 5q toward the optical measuring instrument 2.

The optical path of the direction changed light signal is redirected by the Galvano mirror 1g toward the light receiving section 2b. The direction changed light signal passes through the Galvano mirror 1g to be provided to the light receiving section 2b of the optical measuring instrument 2.

The fifth embodiment exhibits the same advantageous effects as the second embodiment.

Sixth Embodiment

The optical testing apparatus 1 according to a sixth embodiment differs from that of the third embodiment in that an IC 1i is used.

The actual use aspect of the optical measuring instrument 2 according to the sixth embodiment is the same as that of the first embodiment and will not be described (see FIG. A). In the testing use aspect of the optical measuring instrument 2 according to the sixth embodiment, the optical measuring instrument 2 and the optical testing apparatus 1 are used, while neither the reflecting object 4 nor the optical coupler 5 is used (see FIG. 11).

Figure 11:
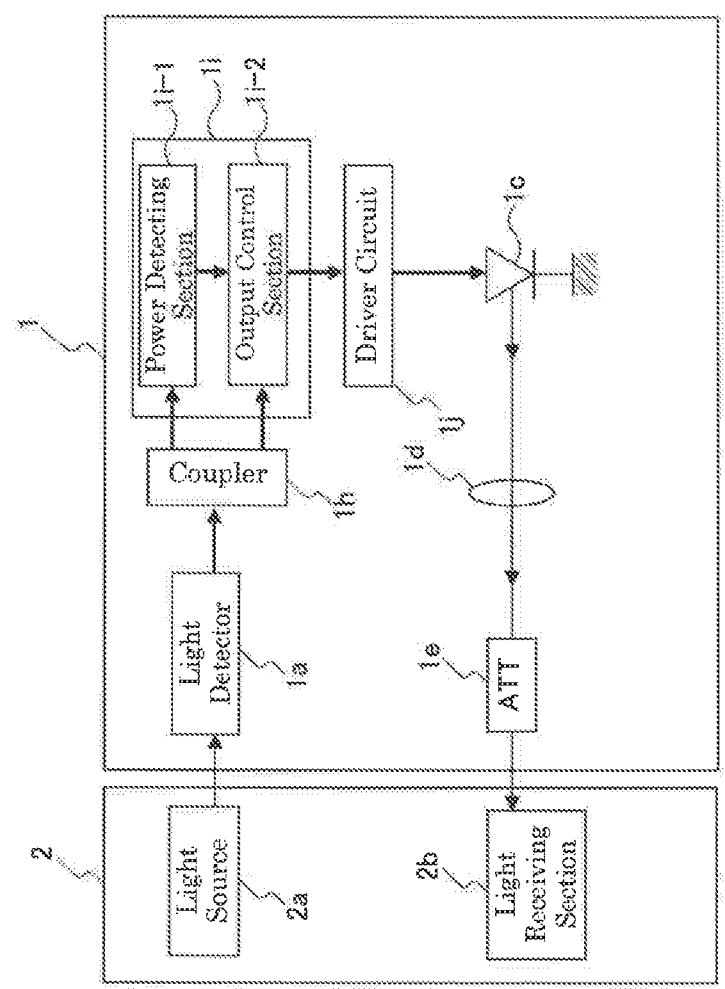
FIG. 11 is a functional block diagram showing the configuration of the optical testing apparatus 1 according to the sixth embodiment of the present invention.

FIG. 11 is a functional block diagram showing the configuration of the optical testing apparatus 1 according to the sixth embodiment of the present invention. The optical testing apparatus 1 according to the sixth embodiment includes a light detector (incident light receiving section) 1a, a laser diode (light signal providing section) 1c, a lens 1d, an optical attenuator 1e, an optical coupler 1h, an IC 1i, and a driver circuit 1j. Components identical to those in the third embodiment will be designated by the same symbols to omit the description thereof.

The light detector (incident light receiving section) 1a, the lens 1d, and the optical attenuator 1e are the same as those in the third embodiment and will not be described.

The optical coupler 1h is arranged to branch an electrical signal output from the light detector 1a into two signals and provide them to a power detecting section 1i-1 and an output control section 1i-2 of the IC 1i.

The IC 1i is an integrated circuit having the power detecting section 1i-1 and the output control section 1i-2.

The power detecting section 1i-1 is arranged to receive an electrical signal and determine whether or not the power of incident light is within a predetermined range. The power detecting section 1i-1 is arranged to activate the output control section 1i-2 if the power of incident light is within the predetermined range. The output control section 1i-2 is arranged to receive an electrical signal and activate the driver circuit 1j after a predetermined delay time (as in the first embodiment).

The driver circuit 1j is arranged to activate the laser diode 1c.

The laser diode (light signal providing section) 1c is arranged to output a light signal (e.g. a laser beam).

It is noted that both the time between reception of incident light by the light detector (incident light receiving section) 1a and activation of the output control section 1i-2 and the time between activation of the driver circuit 1j and output of a light signal from the laser diode 1c are approximately zero. The output control section 1i-2 thus causes, based on an electrical signal, the laser diode (light signal providing section) 1c to output a light signal after a predetermined delay time since the light detector (incident light receiving section) 1a has received incident light.

Next will be described an operation according to the sixth embodiment.

In order to test whether or not the optical measuring instrument 2 can accurately measure the distance D1, the optical testing apparatus 1 is first disposed in front of the optical measuring instrument 2.

Incident light from the light source 2a of the optical measuring instrument 2 is provided to the light detector 1a of the optical testing apparatus 1. The incident light is converted through the light detector 1a into an electrical signal and provided via the optical coupler 1h to the power detecting section 1i-1 and the output control section 1i-2 of the IC 1i.

When the power detecting section 1i-1 receives the electrical signal and activates the output control section 1i-2, the output control section 1i-2 delays the electrical signal by a delay time approximately equal to 2×D1/c and provides it to the driver circuit 1j. When the driver circuit 1j activates the laser diode 1c, the laser diode 1c outputs a light signal. The light signal passes through the lens 1d and the optical attenuator 1e to be provided to the light receiving section 2b of the optical measuring instrument 2.

The sixth embodiment exhibits the same advantageous effects as the third embodiment.

Seventh Embodiment

The optical testing apparatus 1 according to a seventh embodiment differs from that of the first embodiment in that an optical fiber (light signal providing section and incident light delay section) 1k is used in place of the light detector 1a, the variable delay element 1b, and the laser diode 1c.

The actual use aspect and the testing use aspect of the optical measuring instrument 2 according to the seventh embodiment are the same as those of the first embodiment and will not be described (see FIG. 1).

Figure 12:
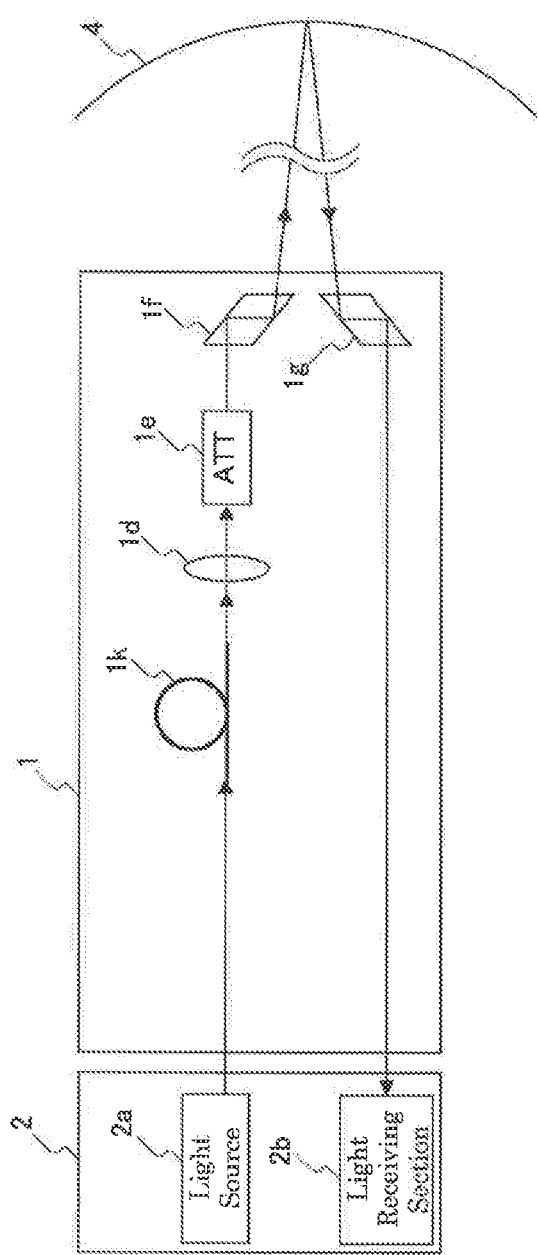
FIG. 12 is a functional block diagram showing the configuration of the optical testing apparatus 1 according to the seventh embodiment of the present invention.

FIG. 12 is a functional block diagram showing the configuration of the optical testing apparatus 1 according to the seventh embodiment of the present invention. The optical testing apparatus 1 according to the seventh embodiment includes an optical fiber (light signal providing section and incident light delay section) 1k, a lens 1d, an optical attenuator 1e, and Galvano mirrors 1f, 1g. Components identical to those in the first embodiment will be designated by the same symbols to omit the description thereof.

The lens 1d, the optical attenuator 1e, and the Galvano mirrors 1f, 1g are the same as those in the first embodiment and will not be described.

In the optical fiber (light signal providing section and incident light delay section) 1k, incident light is delayed by a predetermined delay time (as in the first embodiment) to be a light signal. It is noted that the delay time that can be achieved through the optical fiber 1k is (the refractive index of the optical fiber 1k)×(the length of the optical fiber 1k)/c. If the distance D1 is 200 m, the length of the optical fiber 1k is approximately 270 m, which can be achieved by a bobbin-type optical fiber with a diameter of about 10 cm.

Next will be described an operation according to the seventh embodiment.

In order to test whether or not the optical measuring instrument 2 can accurately measure the distance D1, the optical testing apparatus 1 is first disposed between the optical measuring instrument 2 and the incident object 4 (see FIG. 1B).

Incident light from the light source 2a of the optical measuring instrument 2 is provided to the optical fiber 1k of the optical testing apparatus 1. The incident light is delayed by a delay time approximately equal to 2×D1/c (e.g. 2×D1/c or 2×(D1−D2)/c) through the optical fiber 1k to be a light signal. The light signal passes through the lens 1d, the optical attenuator 1e, and the Galvano mirror 1f to be provided to approximately the center of the incident object 4. The light signal is reflected at the incident object 4 to be a reflected light signal.

The optical path of the reflected light signal is redirected by the Galvano mirror 1g toward the light receiving section 2b. The reflected light signal passes through the Galvano mirror 1g to be provided to the light receiving section 2b of the optical measuring instrument 2.

The seventh embodiment exhibits the same advantageous effects as the first embodiment.

It is noted that while the seventh embodiment describes the case where the optical fiber 1k is used, a multi-reflection cell or a multi-reflection fiber may be used in place of the optical fiber 1k.

Multi-reflection cell is also called Herriott cell, in which a signal is output after multiple reflections between opposed concave mirrors. The delay time that can be achieved through a multi-reflection cell is (the number of multiple reflections within the multi-reflection cell)×(the spacing between the opposed concave mirrors within the multi-reflection cell)/c.

A multi-reflection fiber is obtained by coating the ends of an optical fiber with reflective material. Note that the reflective material is not intended for total reflection. The delay time T1 that can be achieved through a multi-reflection fiber is 2×(the refractive index of the multi-reflection fiber)×(the length of the multi-reflection fiber)/c. Light pulses, if provided to the input port of the multi-reflection fiber, are output at the output port of the multi-reflection fiber at intervals of the delay time T1.

It is noted that an optical switch may be provided to connect the output port of the multi-reflection fiber to total reflective material or a portion of output of a light signal to the lens 1d. The optical switch connects the output port of the multi-reflection fiber to the total reflective material until light travels back and forth predetermined times (m times) between the input port of the multi-reflection fiber and the total reflective material and then connects the output port to the portion of output of a light signal to the lens 1d. In this case, the delay time T2 that can be achieved through the multi-reflection fiber is 2×m×(the refractive index of the multi-reflection fiber)×(the length of the multi-reflection fiber)/c.

Eighth Embodiment

The optical testing apparatus 1 according to an eighth embodiment differs from that of the second embodiment in that an optical fiber (light signal providing section and incident light delay section) 1k is used in place of the light detector 1a, the variable delay element 1b, and the laser diode 1c.

The actual use aspect and the testing use aspect of the optical measuring instrument 2 according to the eighth embodiment are the same as those of the second embodiment and will not be described (see FIG. 1; note that the optical coupler 5 is used in place of the incident object 4). Note that the optical coupler 5 should be included in the optical testing apparatus 1 (see FIG. 13).

Figure 13:
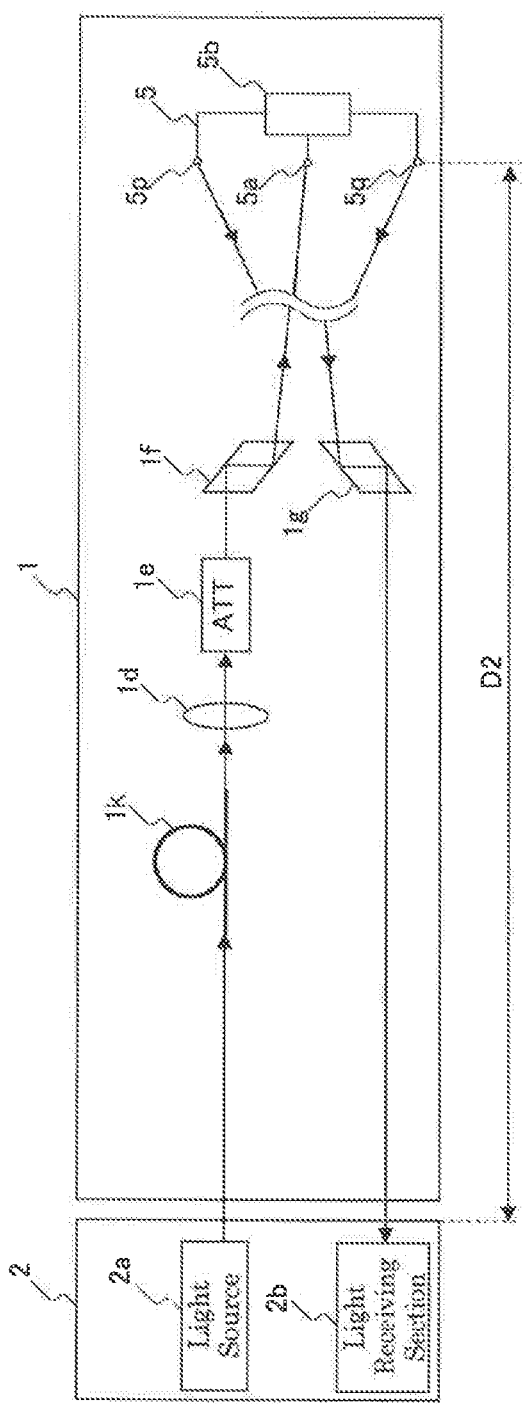
FIG. 13 is a functional block diagram showing the configuration of the optical testing apparatus 1 according to the eighth embodiment of the present invention.

FIG. 13 is a functional block diagram showing the configuration of the optical testing apparatus 1 according to the eighth embodiment of the present invention. The optical testing apparatus 1 according to the eighth embodiment includes an optical fiber (light signal providing section and incident light delay section) 1k, a lens 1d, an optical attenuator 1e, Galvano mirrors 1f, 1g, and an optical coupler (light traveling direction changing section) 5. The optical coupler 5 has an input port 5a, an optical branch section 6b, and output ports 5p, 5q. Components identical to those in the second embodiment will be designated by the same symbols to omit the description thereof.

The lens 1*d*, the optical attenuator 1*e*, the Galvano mirrors 1*f*, 1*g*, and the optical coupler 5 are the same as those in the second embodiment and will not be described.

In the optical fiber (light signal providing section and incident light delay section) 1*k*, incident light is delayed by a predetermined delay time (as in the first embodiment) to be a light signal. It is noted that the delay time that can be achieved through the optical fiber 1*k* is (refractive index of the optical fiber 1*k*)×(length of the optical fiber 1*k*)/c. If the distance D1 is 200 m, the length of the optical fiber 1*k* is approximately 270 m, which can be achieved by a bobbin-type optical fiber with a diameter of about 10 cm.

Next will be described an operation according to the eighth embodiment.

In order to test whether or not the optical measuring instrument 2 can accurately measure the distance D1, the optical testing apparatus 1 having the optical coupler 5 is first disposed in front of the optical measuring instrument 2.

Incident light from the light source 2*a* of the optical measuring instrument 2 is provided to the optical fiber 1*k* of the optical testing apparatus 1. The incident light is delayed by a delay time approximately equal to 2×D1/c (e.g. 2×D1/c or 2×(D1−D2)/c) through the optical fiber 1*k* to be a light signal. The light signal passes through the lens 1*d*, the optical attenuator 1*e*, and the Galvano mirror 1*f* to be provided to the input port 5*a* of the optical coupler 5. The light signal changes its traveling direction through the optical coupler 5 to be a direction changed light signal and then emitted from the output ports 5*p*, 5*q* toward the optical measuring instrument 2.

The optical path of the direction changed light signal is redirected by the Galvano mirror 1*g* toward the light receiving section 2*b*. The direction changed light signal passes through the Galvano mirror 1*g* to be provided to the light receiving section 2*b* of the optical measuring instrument 2.

The eighth embodiment exhibits the same advantageous effects as the second embodiment.

It is noted that while the eighth embodiment describes the case where the optical fiber 1*k* is used, a multi-reflection cell or a multi-reflection fiber may be used in place of the optical fiber 1*k*.

Multi-reflection cell is also called Herriott cell, in which a signal is output after multi reflections between opposed concave mirrors. The delay time that can be achieved through a multi-reflection cell is (the number of multiple reflections within the multi-reflection cell)×(the spacing between the opposed concave mirrors within the multi-reflection cell)/c.

A multi-reflection fiber is obtained by coating the ends of an optical fiber with reflective material. Note that the reflective material is not intended for total reflection. The delay time T1 that can be achieved through a multi-reflection fiber is 2×(the refractive index of the multi-reflection fiber)×(the length of the multi-reflection fiber)/c. Light pulses, if provided to the input port of the multi-reflection fiber, are output at the output port of the multi-reflection fiber at intervals of the delay time T1.

It is noted that an optical switch may be provided to connect the output port of the multi-reflection fiber to total reflective material or a portion of output of a light signal to the lens 1*d*. The optical switch connects the output port of the multi-reflection fiber to the total reflective material until light travels back and forth predetermined times (m times) between the input port of the multi-reflection fiber and the total reflective material and then connects the output port to the portion of output of a light signal to the lens 1*d*. In this case, the delay time T2 that can be achieved through the multi-reflection fiber is 2×m×(the refractive index of the multi-reflection fiber)×(the length of the multi-reflection fiber)/c.

Ninth Embodiment

The optical testing apparatus 1 according to a ninth embodiment differs from that of the third embodiment in that an optical fiber (light signal providing section and incident light delay section) 1*k* is used in place of the light detector 1*a*, the variable delay element 1*b*, and the laser diode 1*c*.

The actual use aspect of the optical measuring instrument 2 according to the ninth embodiment is the same as that of the third embodiment and will not be described.

Figure 14:
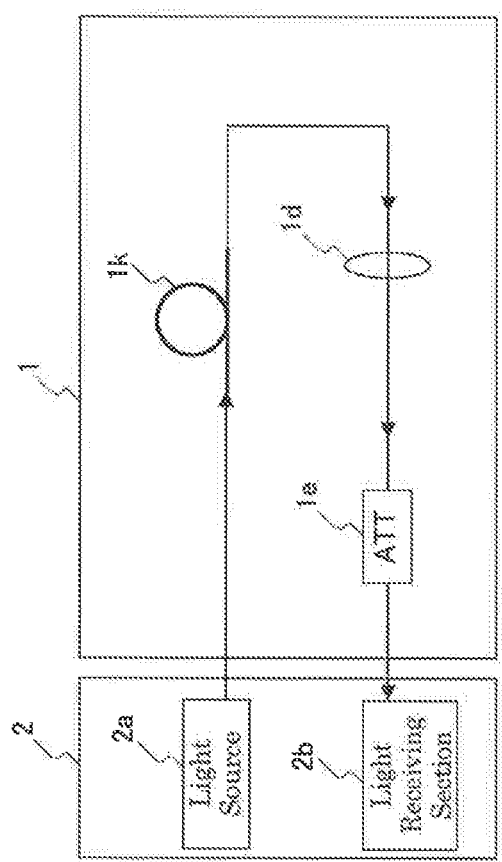
FIG. 14 is a functional block diagram showing the configuration of the optical testing apparatus 1 according to the ninth embodiment of the present invention.

FIG. 14 is a functional block diagram showing the configuration of the optical testing apparatus 1 according to the ninth embodiment of the present invention. The optical testing apparatus 1 according to the ninth embodiment includes an optical fiber (light signal providing section and incident light delay section) 1*k*, a lens 1*d*, and an optical attenuator 1*e*. Components identical to those in the third embodiment will be designated by the same symbols to omit the description thereof.

The lens 1*d* and the optical attenuator 1*e* are the same as those in the third embodiment and will not be described.

In the optical fiber (light signal providing section and incident light delay section) 1*k*, incident light is delayed by a predetermined delay time (as in the first embodiment) to be a light signal. It is noted that the delay time that can be achieved through the optical fiber 1*k* is (refractive index of the optical fiber 1*k*)×(length of the optical fiber 1*k*)/c. If the distance D1 is 200 m, the length of the optical fiber 1*k* is approximately 270 m, which can be achieved by a bobbin-type optical fiber with a diameter of about 10 cm.

Next will be described an operation according to the ninth embodiment.

In order to test whether or not the optical measuring instrument 2 can accurately measure the distance D1, the optical testing apparatus 1 is first disposed in front of the optical measuring instrument 2.

Incident light from the light source 2*a* of the optical measuring instrument 2 is provided to the optical fiber 1*k* of the optical testing apparatus 1. The incident light is delayed by a delay time approximately equal to 2×D1/c (e.g. 2×D1/c or 2×(D1−D2)/c) through the optical fiber 1*k* to be a light signal. The light signal passes through the lens 1*d* and the optical attenuator 1*e* to be provided to the light receiving section 2*b* of the optical measuring instrument 2.

The ninth embodiment exhibits the same advantageous effects as the third embodiment.

It is noted that while the ninth embodiment describes the case where the optical fiber 1*k* is used, a multi-reflection cell or a multi-reflection fiber may be used in place of the optical fiber 1*k*.

Multi-reflection cell is also called Herriott cell, in which a signal is output after multiple reflections between opposed concave mirrors. The delay time that can be achieved through the multi-reflection cell is (the number of multiple reflections within the multi-reflection cell)×(the spacing between the opposed concave mirrors within the multi-reflection cell)/c.

A multi-reflection fiber is obtained by coating the ends of an optical fiber with reflective material. Note that the reflective material is not intended for total reflection. The delay time T1 that can be achieved through a multi-reflection fiber is 2×(the refractive index of the multi-reflection fiber)×(the length of the multi-reflection fiber)/c. Light pulses, if provided to the input port of a multi-reflection fiber, are output at the output port of the multi-reflection fiber at intervals of the delay time T1.

It is noted that an optical switch may be provided to connect the output port of the multi-reflection fiber to total reflective material or a portion of output of a light signal to the lens 1d. The optical switch connects the output port of the multi-reflection fiber to the total reflective material until light travels back and forth predetermined times (m times) between the input port of the multi-reflection fiber and the total reflective material and then connects the output port to the portion of output of a light signal to the lens 1d. In this case, the delay time T2 that can be achieved through the multi-reflection fiber is 2×m×(the refractive index of the multi-reflection fiber)×(the length of the multi-reflection fiber)/c.

Tenth Embodiment

Figure 15:
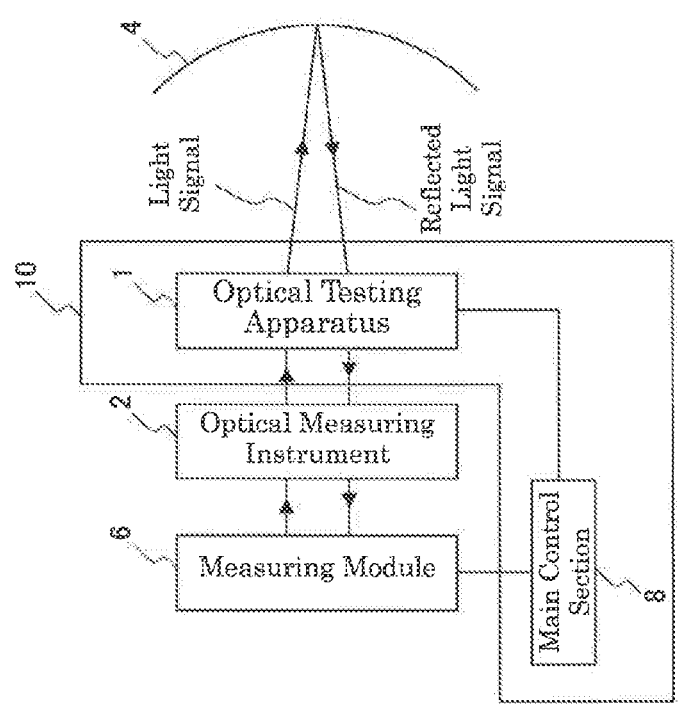
FIG. 15 is a functional block diagram showing the configuration of a test equipment 10 according to a tenth embodiment of the present invention.

FIG. 15 is a functional block diagram showing the configuration of a test equipment 10 according to a tenth embodiment of the present invention.

The test equipment (optical test apparatus) 10 according to the tenth embodiment includes an optical testing apparatus 1 and a main control section 8 (testing section).

The optical testing apparatus 1 is the same as one of those in the above-described embodiments (first to ninth embodiments) and will not be described. It is noted that while an incident object 4 is shown in FIG. 15 (see First, Fourth, and Seventh Embodiments), an optical coupler 5 may be used in place of the incident object 4 (see Second, Fifth, and Eighth Embodiments) or the incident object 4 may not even be used (see Third, Sixth, and Ninth Embodiments).

A measuring module 6 is arranged to use an optical measuring instrument 2 for measurements. The measuring module 6 is arranged to instruct the optical measuring instrument 2 to emit incident light and receive a reflected light signal. As described in the first embodiment, the measuring module 6 is arranged to measure the distance D1 between the optical measuring instrument 2 and the incident object 4 in an actual use aspect (see FIG. 1A). In addition, the measuring module 6 is arranged to measure the responsivity of incident light and a reflected light signal.

The main control section 8 is arranged to conduct a test on measurements by the measuring module 6 using the optical measuring instrument 2. For example, the main control section 8 is arranged to conduct a test on measurements of the responsivity of incident light and reflected light and a test on the accuracy of measurement of the distance D1 between the optical measuring instrument 2 and the incident object 4. It is noted that the main control section 8 is arranged to additionally conduct a function verification test for verifying the function of a control bus, a power supply, etc. and a detection efficiency test for determining whether or not the efficiency of detection of a specific wavelength is within a defined range. The main control section 8 is also arranged to turn ON/OFF incident light from the optical measuring instrument 2, control the power, emission angle, etc. of incident light, set the delay time of the optical testing apparatus 1, control the optical system including the optical attenuator 1e for attenuation of optical power, and control the reflectance of the incident object 4.

DESCRIPTION OF REFERENCE NUMERAL

2 Optical Measuring Instrument
2a Light Source
2b Light Receiving Section
4 Incident Object
5 Optical Coupler (Light Traveling Direction Changing Section)
5a Input Port
5b Optical Branch Section
5p, 5q Output Port
1 Optical Testing Apparatus
1a Light Detector (Incident Light Receiving Section)
1b Variable Delay Element (Electrical Signal Delay Section)
1b-1, 1b-2 Delay Element
1c Laser Diode (Light Signal Providing Section)
1d Lens
1e Optical Attenuator
1f, 1g Galvano Mirrors
1h Optical Coupler
1i IC
1i-1 Power Detecting Section
1i-2 Output Control Section
1j Driver Circuit
1k Optical Fiber (Light Signal Providing Section and Incident Light Delay Section)
6 Measuring Module
8 Main Control Section
10 Test Equipment

What is claimed is:

1. An optical testing apparatus for use in testing an optical measuring instrument that provides incident light from a light source to an incident object and receives reflected light due to reflection of the incident light at the incident object, the optical testing apparatus comprising:
   an incident light receiving section that receives incident light; and
   a light signal providing section that provides a light signal to the optical measuring instrument after a predetermined delay time since the incident light receiving section has received the incident light, wherein
   the optical measuring instrument includes a light receiver,
   the optical testing apparatus provides the light signal directly to the optical measuring instrument, and
   the delay time is approximately equal to the time between emission of the incident light from the light source and reception of the reflected light by the optical measuring instrument in a case of actually using the optical measuring instrument.

2. The optical testing apparatus according to claim 1, wherein
   the incident light receiving section is arranged to convert the incident light into an electrical signal, and
   the light signal providing section is arranged to convert the electrical signal delayed by the delay time into the light signal.

3. The optical testing apparatus according to claim 1, wherein
   the incident light receiving section is arranged to convert the incident light into an electrical signal,
   the optical testing apparatus further comprising an output control section that causes the light signal providing section to output the light signal based on the electrical signal after the delay time since the incident light receiving section has received the incident light.

4. The optical testing apparatus according to claim 1, further comprising an attenuator that attenuates a power of the light signal, wherein
   a degree of attenuation is variable in the attenuator.

5. The optical testing apparatus according to claim 1, wherein the incident object has a variable reflectance.

6. A semiconductor testing apparatus comprising:
the optical testing apparatus according to claim 1; and
a testing section that conducts a test on measurements using the optical measuring instrument.

7. The optical testing apparatus according to claim 1, wherein
the incident light receiving section is a photodetector, and
the light signal providing section is a laser diode.

8. An optical testing method for testing an optical measuring instrument that provides incident light from a light source to an incident object and receives reflected light due to reflection of the incident light at the incident object and that has a light receiver, the optical testing method comprising:
receiving incident light;
providing a laser beam to the optical measuring instrument after a predetermined delay time since the incident light has been received; and
arranging the light receiver on the laser beam, wherein
the delay time is approximately equal to the time between emission of the incident light from the light source and reception of the reflected light by the optical measuring instrument in a case of actually using the optical measuring instrument.

9. An optical testing method for testing an optical measuring instrument that provides incident light from a light source to an incident object and receives reflected light due to reflection of the incident light at the incident object and that has a light receiver, the optical testing method comprising:
receiving incident light; and
providing a laser beam to the optical measuring instrument after a predetermined delay time since the incident light has been received, wherein
the laser beam travels directly to the optical measuring instrument, and
the delay time is approximately equal to the time between emission of the incident light from the light source and reception of the reflected light by the optical measuring instrument in a case of actually using the optical measuring instrument.

* * * * *